Dec. 25, 1962  G M. NELSON  3,069,738
TRACTOR LOGGING HOOK
Filed March 27, 1961
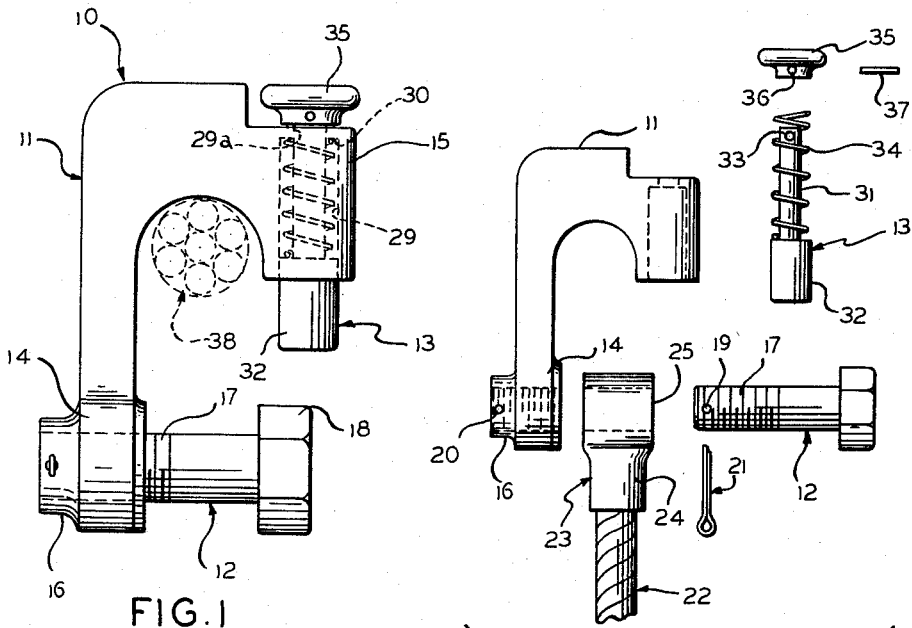
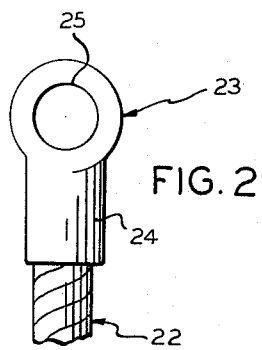
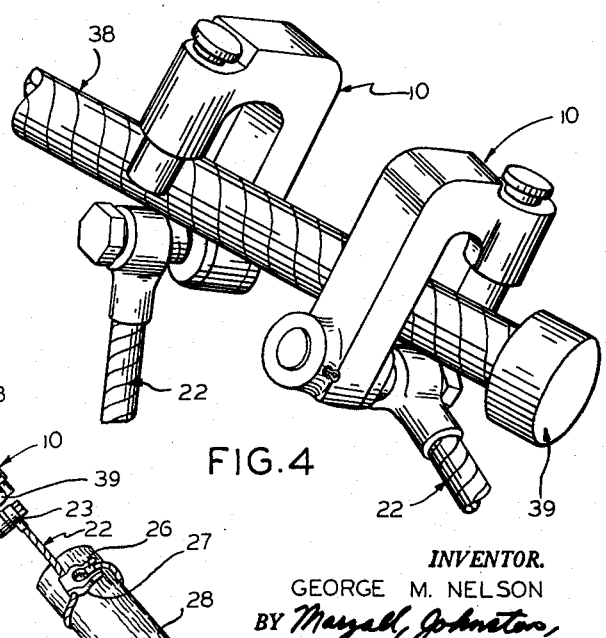
INVENTOR.
GEORGE M. NELSON
BY Maryall, Johnston,
Cook + Root
ATTORNEYS

United States Patent Office 3,069,738
Patented Dec. 25, 1962

3,069,738
TRACTOR LOGGING HOOK
George M. Nelson, Star Rte. S., Waldport, Oreg.
Filed Mar. 27, 1961, Ser. No. 98,651
5 Claims. (Cl. 24—123)

This invention relates in general to tractor logging hooks, and more particularly to a tractor logging hook adapted to have a choker cable securely fastened thereto and to be selectively attached to a tractor logging cable or line.

Tractor logging comprises having a tractor with a winch or suitable power source for drawing a tractor cable over logs and toward the tractor and to a landing. Choker cables are secured to logs and subsequently hooked on to the tractor cable so that the logs may be drawn toward the tractor during the winching operation. It is necessary to have some means for facilitating the hooking on of the choker cables to the tractor cable, and the present invention contemplates a tractor logging hook for attachment to the choker cables and subsequent selective attachment to the tractor cable. In this instance, the tractor cable will have a butt-ferrule at the very end thereof which will provide a stop against which the hooks may lodge after being secured to the cable.

Heretofore, butt hooks have been provided at the end of a tractor cable which can only hold a limited amount of choker cables thereby permitting the tractor to drag a partial load most of the time and limiting the logging capacity of the tractor.

It is an object of the present invention to provide a tractor logging hook for selective attachment to a tractor cable wherein any amount of choker cables and logs may be coupled to the tractor cable, and butt hooks are eliminated.

Also, with the known hooks used in the past, much time is lost in making up a load for the tractor cable as logs are strung out on the ground and it is necessary to move the tractor cable up several times in order to obtain a load. To couple up additional logs, slack is needed on the tractor cable most of the time and choker cables already coupled to the tractor cable quite often disengage themselves from the butt hook when such slack in the line is provided.

Therefore another object of the present invention is to provide a tractor logging hook which obviates the difficulties named in the above paragraph wherein choker cables are securely fastened to the tractor logging hook of the present invention and the hook positively locks on the tractor line and cannot be disengaged therefrom when slack in the tractor line is provided.

Still another object of the present invention is to provide a tractor logging hook which will provide faster and more efficient tractor logging operations in the gathering of logs.

A still further object of the present invention resides in the provision of a tractor logging hook capable of connecting choker cables to a main tractor cable wherein any number of hooks and choker cables may be attached to the main tractor cable thereby permitting a full load to be handled by the tractor cable at all times.

Other objects, features and advantages of the invention will be apparent from the following detailed disclosure, taken in conjunction with the accompanying sheet of drawing, wherein like reference numerals refer to like parts, in which:

FIG. 1 is a front elevational view of the tractor logging hook of the present invention, and illustrating in phantom the relative positioning of the tractor logging cable;

FIG. 2 is a side elevational view of a choker cable or line having an eyed-ferrule at the end thereof;

FIG. 3 is an exploded view of the tractor logging hook of the present invention illustrating the various parts and as associated with a choker cable which will be received by the hook;

FIG. 4 is a perspective view of a pair of tractor logging hooks of the present invention and showing how they are arranged on a tractor cable; and FIG. 5 is a perspective view, smaller in scale, and illustrating how a pair of tractor logging hooks of the present invention are arranged on a tractor cable and showing how the choker cables are attached to logs.

Referring now to the drawings, the tractor logging hook of the present invention is generally designated by the numeral 10 and includes generally a hook shaped body 11, a choker cable securing bolt 12, and a guard pin 13.

The hook shaped body 11 includes a choker cable attaching end 14 and a nose end 15. A boss 16 is integral with the choker cable attaching end 14 and internally threaded to receive the threaded end 17 of the choker cable securing bolt 12. A head 18 of any desirable shape, and preferably of a shape to receive a tool is carried on the end of the bolt 12 opposite the threaded end 17 to facilitate securing of the bolt 12 to the choker cable attaching end 14 of the hook. In order to positively prevent relative rotation of the bolt 12 in the boss during the logging operations, a transversely extending hole 19 is provided in the threaded end of the bolt 12 to align with transversely extending and aligned openings 20 provided in the boss 16 to receive a pin 21 of any desired type.

Choker cables or lines for attachment to the hooks are designated by the numeral 22 and in this instance provided with an eyed-ferrule 23 secured to an end thereof which includes a ferrule body 24 and an eye 25. The eye 25 of the eyed-ferrule 23 is adapted to be pivotally received on the bolt 12 and securely locked between the head 18 of the bolt and the boss 16 of the choker cable attaching end 14 of the hook.

As seen in FIG. 5, the end of the choker line opposite from the eyed-ferrule 23 may be provided with a butt-ferrule 26 that seats in a socket of a sleeve 27 swivelly and slidably carried on the choker cable. Thus the end of the choker cable is trained about one end of a log 28 and locked to the sleeve. After the choker line is attached to a hook, it need not be detached therefrom until it wears out and needs to be replaced.

The nose end 15 of the hook shaped body 11 is hollow and provided with a bore 29 which is reduced in cross-section at the upper end to define a shoulder 30 and a further reduced bore 29a. The guard pin 13 is received in the bore 29 of the nose end 15 of the body and includes an elongated shaft 31 having an enlarged head 32 at its lower end and a transversely extending pin hole 33 at its upper end. The enlarged head 32 is sized slightly smaller than the bore 29 and therefore slidably received therein, while the shaft 31 is sized slightly smaller than the reduced bore 29a defined by the shoulder 30 and therefore slidably received and guided therein. A coil spring 34 is received around the shaft 31 and bottomed at one end on the upper end of the enlarged head 32 and at the other end on the shoulder 30. A button or knob 35 is provided with a blind bore and a transversely aligned hole 36 whereby the upper end of the shaft 31 is received in the blind bore and the holes 33 and 36 align to receive a lock pin 37 and thereby securely lock the button 35 to the upper end of the shaft 31 and prevent downward movement of the guard pin 13 by virtue of the fact that the button 35 is larger than the upper reduced bore 29a and prevents withdrawal of the button therethrough. Thus, the pin 13 is resiliently biased so that the head 32 is always forced in the direction of the head 18 of the bolt 12. Grasping of the button 35 and upward movement of the guard pin increases the opening between the head 32 of the pin and the head 18 of the bolt 12 to permit movement therebetween of the tractor logging cable which is generally designated by the numeral 38. Therefore, the pin head 32 and the bolt head 18 are so arranged and sized as to define therebetween an opening smaller than the external dimension of the tractor logging cable 38.

Referring particularly to FIGS. 4 and 5, an enlarged butt-ferrule 39 is secured to the end of the tractor cable or line 38 and sized to be greater than the opening provided in the hook 10. As above explained, when it is desired to attach a hook 10 and accompanying choker cable to the main tractor cable, it is necessary to pull the guard pin up within the nose end of the hook until ample space is defined between the nose end and the bolt head 18 to permit movement of the hook onto the tractor logging cable 38. Likewise, it is not possible to disengage the hook 10 from the tractor logging cable without first grasping the button 35 of the head pin 13 and moving the pin against the biasing action of the coil spring 34 until the pin head 32 is substantially within the confines of the bore 29 at the nose end of the hook. Thus, accidental disengaging of the tractor logging hook and the choker cable from the tractor cable is not possible. And as seen in FIGS. 4 and 5, the first hook placed on the tractor cable lodges against the butt-ferrule 39, while the second hook will lodge against the first hook after it has been drawn up tight thereagainst by tensioning of the choker cables 22. Therefore, any number of hooks and choker cables may be attached to a single tractor cable as long as the capacity of the tractor cable and tractor winch is not overloaded.

It will be understood that modifications and variations may be effected without departing from the scope of the novel concepts of the present invention, but it is understood that this application is to be limited only by the scope of the appended claims.

The invention is hereby claimed as follows:

1. A tractor logging hook for removably attaching a choker cable having an eyed-ferrule to a tractor cable having a butt-ferrule, said hook comprising a hook-shaped body having a nose end and a choker cable attaching end, a bolt having a body threaded at one end and provided with a head at the other end, said bolt being threadedly received by the choker cable attaching end of said hook and receiving the eyed-ferrule of the choker cable to secure same to said hook, a guard pin slidably mounted on said nose end and coacting with said bolt to selectively permit the tractor cable to pass therebetween, said pin and bolt coacting with said body to define an opening smaller than the butt-ferrule on the tractor cable, and means for resiliently biasing said guard pin in one direction toward said bolt.

2. A tractor logging hook for removably attaching a choker cable having an eyed-ferrule to a tractor cable having a butt-ferrule, said hook comprising a hook-shaped body having a nose end and a choker cable attaching end, an internally threaded boss at said choker cable attaching end, a bolt threadedly received by said boss and securing the eyed-ferrule of a choker cable to said hook, and a guard pin slidably mounted on said nose end and coacting with said bolt to selectively permit the tractor cable to pass therebetween, said pin and bolt coacting with said body to define an opening smaller than the butt-ferrule on the tractor cable.

3. A tractor logging hook for removably attaching a choker cable having an eyed-ferrule to a tractor cable having a butt-ferrule, said hook comprising a hook-shaped body having a nose end and a choker cable attaching end, an internally threaded boss at said choker cable attaching end, a bolt threadedly received by said boss and securing the eyed-ferrule of a choker cable to said hook, a guard pin slidably mounted on said nose end and coacting with said bolt to selectively permit the tractor cable to pass therebetween, said pin and bolt coacting with said body to define an opening smaller than the butt-ferrule on the tractor cable, and means for resiliently biasing said guard pin in one direction toward said bolt.

4. A tractor logging hook for removably attaching a choker cable having an eyed-ferrule to a tractor cable having a butt-ferrule, said hook comprising a hook-shaped body having a nose end and a choker cable attaching end, an internally threaded boss at said choker cable attaching end, a bolt having a body threaded at one end and provided with a head at the other end, said bolt being threadedly receivd by said boss and receiving the eyed-ferrule of the choker cable to secure same to said hook, a guard pin slidably mounted on said nose end and coacting with said bolt to selectively permit the tractor cable to pass therebetween, said pin and bolt coacting with said body to define an opening smaller than the butt-ferrule on the tractor cable, and means for resiliently biasing said guard pin in one direction toward said bolt.

5. A tractor logging hook for removably attaching a choker cable having an eyed-ferrule to a tractor cable having a butt-ferrule, said hook comprising a hook-shaped body having a nose end and a choker cable attaching end, an internally threaded boss at said choker cable attaching end, a bolt having a body threaded at one end and provided with a head at the other end, said bolt being threadedly received by said boss and receiving the eyed-ferrule of the choker cable to secure same to said hook, said nose end being hollow and having a guard pin slidably received therein, means in said nose end hollow resiliently biasing said pin toward said bolt whereby said pin coacts with said bolt to selectively permit the tractor cable to pass therebetween, and said pin and bolt coacting with said body to define an opening smaller than the butt-ferrule on the tractor cable.

References Cited in the file of this patent

UNITED STATES PATENTS

| | | |
|---|---|---|
| 38,224 | Gage | Apr. 21, 1863 |
| 254,602 | Brown | Mar. 7, 1882 |
| 551,753 | Brewer | Dec. 24, 1895 |
| 888,308 | Colfelt | May 19, 1908 |
| 982,113 | Ashdown | Jan. 17, 1911 |
| 1,129,671 | Hardy | Feb. 23, 1915 |
| 1,864,974 | Buckley | June 28, 1932 |

FOREIGN PATENTS

| | | |
|---|---|---|
| 332,311 | Great Britain | July 24, 1930 |